(12) United States Patent
Wäller

(10) Patent No.: US 9,283,829 B2
(45) Date of Patent: Mar. 15, 2016

(54) PROCESS AND DEVICE FOR DISPLAYING DIFFERENT INFORMATION FOR DRIVER AND PASSENGER OF A VEHICLE

(75) Inventor: Christoph Wäller, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 739 days.

(21) Appl. No.: 13/577,693

(22) PCT Filed: Feb. 28, 2011

(86) PCT No.: PCT/EP2011/000963
§ 371 (c)(1),
(2), (4) Date: Oct. 25, 2012

(87) PCT Pub. No.: WO2011/110294
PCT Pub. Date: Sep. 15, 2011

(65) Prior Publication Data
US 2013/0047112 A1 Feb. 21, 2013

(30) Foreign Application Priority Data

Mar. 11, 2010 (DE) .......................... 10 2010 011 039

(51) Int. Cl.
*G06F 3/0481* (2013.01)
*G06F 3/0484* (2013.01)
(Continued)

(52) U.S. Cl.
CPC ............ *B60H 1/00985* (2013.01); *B60K 37/00* (2013.01); *B60K 37/06* (2013.01); *G06F 3/0488* (2013.01); *G06F 3/04815* (2013.01); *G06F 3/04842* (2013.01); *G06F 3/04845* (2013.01); *B60K 2350/1004* (2013.01);
(Continued)

(58) Field of Classification Search
CPC G06F 3/04815; G06F 3/0488; G06F 3/04842
See application file for complete search history.

(56) References Cited

U.S. PATENT DOCUMENTS 5,463,725 A * 10/1995 Henckel et al. ............... 715/776
6,181,301 B1 * 1/2001 Inoguchi et al. ............... 345/5
(Continued)

FOREIGN PATENT DOCUMENTS

DE         4301766 A1    8/1993
DE   102004048956 A1    4/2006
(Continued)

OTHER PUBLICATIONS

2D Boy, "World of Goo," screenshots from running program copyright 2009.*
(Continued)

*Primary Examiner* — Ryan Barrett
(74) *Attorney, Agent, or Firm* — Barnes & Thornburg LLP

(57) ABSTRACT

A method for operating a user interface, wherein at least one flat graphics object is shown on a display surface in a first view showing a first side of the object and in a second view showing the second side of the object. On different sides of the object, different information is shown and the view of the graphics object is varied such that, in a perspective view on the display surface, the graphics object rotates from the first side to the second side when a first or a second control signal has been triggered. Different information is shown on the second side after a rotation from the first side to the second side depending on whether the first or the second control signal has been triggered. Also disclosed is a device for providing such a user interface.

16 Claims, 4 Drawing Sheets

(51) Int. Cl.
*G06F 3/0488* (2013.01)
*B60H 1/00* (2006.01)
*B60K 37/00* (2006.01)
*B60K 37/06* (2006.01)

(52) U.S. Cl.
CPC ............... *B60K 2350/1012* (2013.01); *B60K 2350/1032* (2013.01); *B60K 2350/901* (2013.01); *B60K 2350/903* (2013.01)

(56) References Cited

U.S. PATENT DOCUMENTS

| | | | |
|---|---|---|---|
| 6,388,684 B1* | 5/2002 | Iwamura et al. | 715/788 |
| 6,430,501 B1* | 8/2002 | Slominski | 701/429 |
| 6,448,987 B1* | 9/2002 | Easty et al. | 715/834 |
| 6,526,335 B1* | 2/2003 | Treyz et al. | 701/1 |
| 6,577,330 B1* | 6/2003 | Tsuda et al. | 715/782 |
| 6,621,471 B1* | 9/2003 | Ozaki et al. | 345/4 |
| 6,769,320 B1* | 8/2004 | Bollgohn et al. | 73/866.3 |
| 7,081,882 B2 | 7/2006 | Sowden et al. | |
| 7,171,630 B2 | 1/2007 | O'Leary et al. | |
| 7,222,134 B1* | 5/2007 | Maruyama et al. | |
| 7,315,312 B2 | 1/2008 | Hemmings | |
| 7,730,425 B2* | 6/2010 | de los Reyes et al. | 715/835 |
| 7,814,419 B2* | 10/2010 | Fabritius | 715/702 |
| 7,865,301 B2* | 1/2011 | Rasmussen et al. | 701/457 |
| 7,966,577 B2* | 6/2011 | Chaudhri et al. | 715/835 |
| 8,018,579 B1* | 9/2011 | Krah | 356/4.01 |
| 8,327,291 B2* | 12/2012 | Oguchi | 715/790 |
| 2001/0017615 A1* | 8/2001 | Lin et al. | 345/173 |
| 2002/0016235 A1* | 2/2002 | Ashby et al. | 482/8 |
| 2003/0142136 A1* | 7/2003 | Carter et al. | 345/782 |
| 2003/0230443 A1* | 12/2003 | Cramer et al. | 180/65.5 |
| 2005/0195157 A1* | 9/2005 | Kramer et al. | 345/156 |
| 2005/0267676 A1* | 12/2005 | Nezu et al. | 701/200 |
| 2007/0024580 A1* | 2/2007 | Sands et al. | 345/156 |
| 2007/0073944 A1* | 3/2007 | Gormley | 710/72 |
| 2007/0297064 A1* | 12/2007 | Watanabe et al. | 359/630 |
| 2008/0024463 A1* | 1/2008 | Pryor | 345/175 |
| 2008/0133122 A1* | 6/2008 | Mashitani et al. | 701/200 |
| 2008/0242511 A1* | 10/2008 | Munoz et al. | 482/5 |
| 2009/0002145 A1* | 1/2009 | Berry et al. | 340/436 |
| 2009/0146846 A1* | 6/2009 | Grossman | 340/988 |
| 2009/0160803 A1* | 6/2009 | Hashimoto | 345/173 |
| 2009/0199120 A1* | 8/2009 | Baxter et al. | 715/765 |
| 2009/0261966 A1* | 10/2009 | Cutchis | 340/522 |
| 2009/0273574 A1* | 11/2009 | Pryor | 345/173 |
| 2009/0278390 A1* | 11/2009 | Carter | 297/217.4 |
| 2010/0100844 A1* | 4/2010 | Narahashi et al. | 715/810 |
| 2010/0106323 A1* | 4/2010 | Wallaert et al. | 700/276 |
| 2010/0214238 A1* | 8/2010 | Christoph et al. | 345/173 |
| 2010/0315417 A1* | 12/2010 | Cho et al. | 345/419 |
| 2011/0001726 A1* | 1/2011 | Buckingham et al. | 345/175 |
| 2011/0012719 A1* | 1/2011 | Hilger et al. | 340/435 |
| 2011/0047460 A1* | 2/2011 | Choe | 715/702 |
| 2011/0050591 A1* | 3/2011 | Kim | G06F 3/0488 345/173 |
| 2011/0179363 A1* | 7/2011 | Dehmann et al. | 715/764 |
| 2011/0205162 A1* | 8/2011 | Waller et al. | 345/173 |
| 2012/0054690 A1* | 3/2012 | Lim | 715/852 |
| 2012/0109455 A1* | 5/2012 | Newman et al. | 701/36 |
| 2012/0200495 A1* | 8/2012 | Johansson | 345/156 |
| 2012/0260217 A1* | 10/2012 | Celebisoy | 715/836 |
| 2012/0314020 A1* | 12/2012 | Ng-Thow-Hing | 348/36 |
| 2013/0194308 A1* | 8/2013 | Privault et al. | 345/650 |
| 2013/0346911 A1* | 12/2013 | Sripada | 715/782 |

FOREIGN PATENT DOCUMENTS

| | | |
|---|---|---|
| DE | 102007034272 A1 | 1/2009 |
| DE | 102008017051 A1 | 10/2009 |
| DE | 102008034507 A1 | 1/2010 |
| EP | 1672474 A2 | 6/2006 |
| EP | 1977926 A2 | 10/2008 |
| JP | 2000163193 | 6/2000 |
| JP | 2005071286 | 3/2005 |
| JP | 2008260519 A | 10/2008 |
| KR | 100861666 | 9/2008 |
| WO | WO 2009024400 A1 * | 2/2009 |
| WO | 2010010025 A1 | 1/2010 |

OTHER PUBLICATIONS

Imagine Games Network, "World of Goo Preview," Jan. 22, 2008, http://www.ign.com/articles/2008/01/22/world-of-goo-preview.*
Office Action for Korean Patent Application No. 10-2012-7025019; Oct. 2, 2014.
Search Report for International Patent Application No. PCT/EP2011/000963; Aug. 10, 2011.

* cited by examiner

PROCESS AND DEVICE FOR DISPLAYING DIFFERENT INFORMATION FOR DRIVER AND PASSENGER OF A VEHICLE

PRIORITY CLAIM

This patent application is a U.S. National Phase of International Patent Application No. PCT/EP2011/000963, filed 28 Feb. 2011, which claims priority to German Patent Application No. 10 2010 011 039.6, filed 11 Mar. 2010, the disclosures of which are incorporated herein by reference in their entirety.

FIELD

Disclosed embodiments relate to a method for operating a user interface, in which at least one two-dimensional, graphical object may be presented on a display panel in a first presentation, which shows a first side of the object, and in a second presentation, which shows the second side of the object.

BACKGROUND

Graphical user interfaces are known particularly for computers and for operator control systems of electronic devices, in which they allow the user to interact with the machine by means of graphical symbols, also called objects. In this context, these objects can be controlled in a wide variety of ways. By way of example, they can be selected or moved by means of manual operator control elements, such as keys, rotary pressure controls or a mouse, using a touch-sensitive display panel or using gestures which are sensed in front of or on the display panel and are converted into control signals.

Today, mass-produced vehicles have functional devices, such as an air conditioning system, which is operated by means of mechanical keys and rotary controls. On account of a large diversity of variants owing to country-specific requirements and equipment variants, high levels of complexity arise in the planning and production of the operator control modules in this context. In addition, the increasing diversity of functions results in excess loading with switches, which means that these are no longer comprehensible to the user, make access to functions which are considered essential more difficult and hence increase the risk of distraction from the road traffic.

On account of this increase in electronic devices and the diversity of functions thereof in vehicles, it is now standard practice to also equip vehicles with an operator control system which has a graphical user interface in order to be able to control the various operator control systems of the vehicle, for example air conditioning system, radio, CD player, communication device or navigation system, by using a few, user-programmable operator control elements.

DE 10 2008 034 507 A1 describes a method for displaying information in a motor vehicle, in which a displayed two-dimensional graphical object may be rotated from the front to the back. In this case, the presentation may be chosen such that the display panel may be used as well as possible and the presented information can be grasped quickly and intuitively by the driver of the vehicle. This is achieved by virtue of perspective rotation of the graphical object, which in this case is always completely visible within the context of the perspective view. The front may be used to present display information and elementary setting options for functional devices in the vehicle, while the back can be used to make detail settings.

In addition, the documents U.S. Pat. No. 7,315,312 BS, U.S. Pat. No. 7,171,630 B2, U.S. Pat. No. 7,081,882 B2, JP 2000163193 A, EP 1 672 474 A2 and DE 43 01 766 C2 describe methods for graphical presentation of page turning for book pages, with particular discussion of the aspect of the realistic three-dimensional effect being provided.

SUMMARY

Disclosed embodiments enable the presentation of different information on different sides of a displayed graphical object. The presentation of the graphical object may be altered such that the graphical object may be rotated from the first side to the second side in a perspective presentation on a display panel when a first or a second control signal has been triggered. Disclosed embodiments also relate to an associated apparatus for providing such a user interface.

Disclosed embodiments also provide a method for such presentation that may be particularly suitable for a display panel in a vehicle. However, it can also be used in conjunction with other display panels, particularly when such a display panel may be used by a plurality of users simultaneously.

BRIEF DESCRIPTION OF THE FIGURES

Disclosed embodiments are explained herein in more detail with reference to the Figures, wherein.

DETAILED DESCRIPTION OF DISCLOSED EMBODIMENTS

Figure 1:
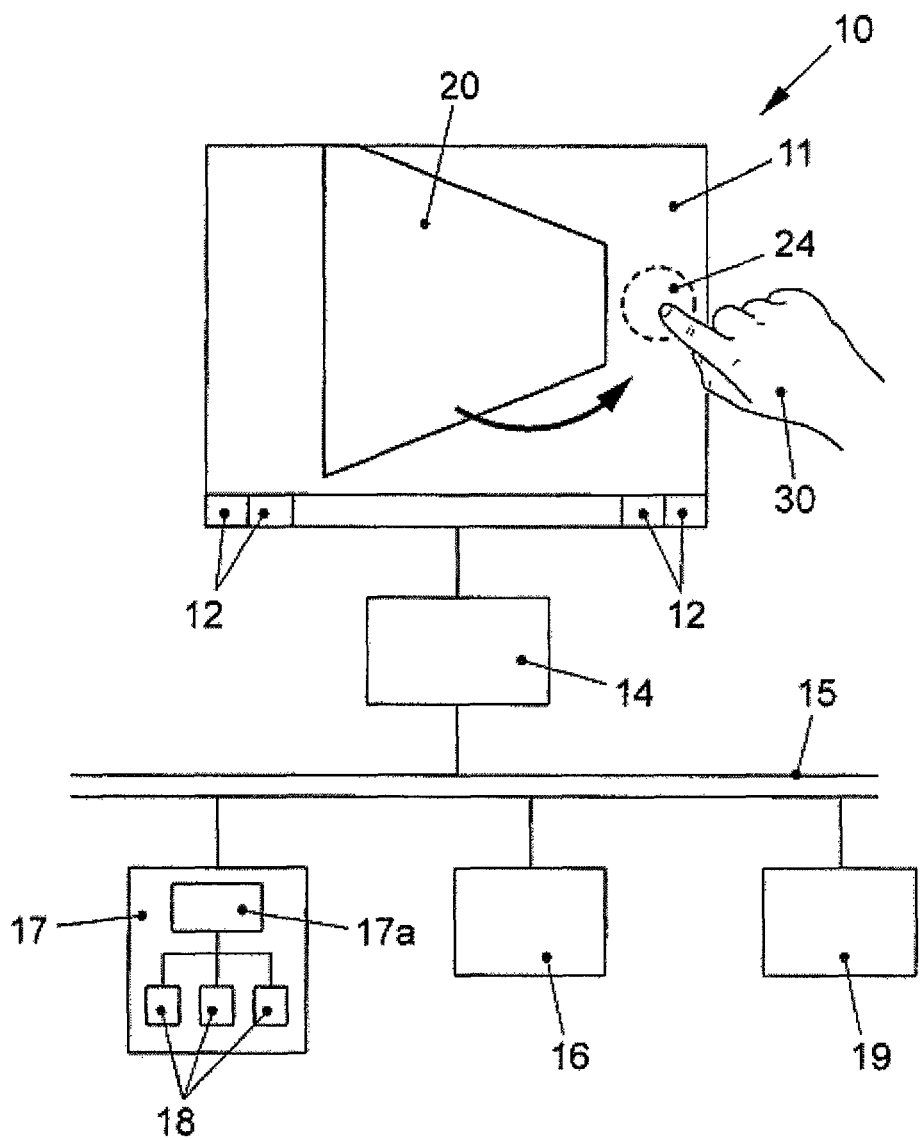
FIG. 1 schematically shows the design of a disclosed embodiment of an apparatus for providing a user interface.

In accordance with disclosed embodiments, a method and an apparatus provide a graphical user interface of the type mentioned above, which can be quickly customized to suit varied user requirements, particularly when a plurality of users make settings using the user interface in alternate succession.

A disclosed embodiment provides a method wherein a rotation from the first side to the second side may be followed by different information being presented on the second side on the basis of whether the first or the second control signal has been triggered. The information presented on the first side may be typically a subset of a piece of overall information. The features of the control signal allow a different subset of the overall information to be specifically displayed on the second side in comparison with the information on the first side, this subset being determined by the control signal. This enables the presented information to be customized flexibly to suit different user requirements, particularly when a plurality of users use a user interface in succession.

The basic idea of the disclosed embodiments involves the concept of two-side logic. In this case, there exists, for a first side, a second side which can be used to display various pieces of information based on a particular criterion, in this case, based on a control signal. In general, the first side can also be synonymously called the front and the second side the back, with a plurality of different backs existing for a front.

Advantageously, the object may be rotated from the first to the second side such that the axis of rotation or the center of rotation, which may be associated with the rotation, is dependent on the control signal. This provides the option of providing the user with a visual indication—during the actual rotation—of which control signal has been triggered and which information will appear on the second side. In this case, the user can also intuitively recognize whether the correct control signal has been triggered, or whether a mistrigger has possibly occurred.

In one implementation of the method according to the disclosed embodiments, more than two different control signals may be recognized and more than two backs with a different information content may be provided. It is, thus, possible for four different backs to be provided, for example, which may be presented around the center of the object via different instances of the corners or edges as a result of rotations by the object, if the latter is rectangular.

The rotation can be executed in an animated form, for example in a rotary movement, which may be first of all accelerated from the initial state and then decelerated again to the final state. Advantageous rotation algorithms are described in DE 10 2008 034 507 A1, already cited at the outset.

Within the context of the disclosed embodiments, a control signal may be a physical signal which is triggered by an operating event and which is sensed by a means for sensing control signals, and which is used for controlling at least one method step or operation on physical resources provided for this purpose. The first and second control signals may, therefore, also be made up of a plurality of control signals. It is also possible to use individual features of a control signal to control a single method step. By way of example, it would thus be possible for one feature of the control signal to determine the information content that is to be displayed on the second side and for another feature to define the axis of rotation.

Besides operator control elements, the means for sensing control signals may also comprise means for user recognition. In one implementation of the method according to disclosed embodiments, the user who has triggered the control signal by virtue of an operating event may be sensed and the control signal may be associated with the first or second control signal on the basis of the sensed user. This enables the information presented on the second side to be customized on a user-specific basis.

User recognition can be effected in a wide variety of ways. Firstly, a user or a user group can be identified by virtue of the operation of an operator control element, which is associated with said user or user group. In this case, the operator control element may be in the exclusive range of these users, for example. Alternatively or in addition, user identification can be supported by a camera system.

Furthermore, the location, angle or direction at which or from which an operating element enters a detection range formed around an operator control element can be determined and associated with a user. In particular, it may be possible to distinguish between the driver and the front-seat passenger in a vehicle depending on the location of the operating element in the left-hand or right-hand half of the detection range. The respective user could also use an operating element, which he uses to render himself recognizable to the system, for example a radio signal pin which emits an identification code that can be associated with the user and which can be sensed by the system.

User recognition could also be effected by means of sensor sensing, for example by means of an electrode arrangement in the seat of the user. By way of example, this electrode arrangement can be used to couple an identification code capacitively into the body of the driver or front-seat passenger. The identification code may be in this case able to identify the seat position and the user himself. The identification code may be transmitted by means of the body of the user and may be output capacitively at the fingertip, so that it can be transmitted to a reception device in the system, for example. For further details of this signal transmission, reference is made to DE 10 2004 048 956 A1 and the further literature cited therein, which are hereby incorporated into the present application by reference. In particular, the circuit devices used in DE 10 2004 048 956 A1 can be used.

In one advantageous implementation of a method provided in accordance with disclosed embodiments, at least two delimited areas may be defined on the display panel. Operation of an operator control element associated with the first area prompts the first control signal to be triggered and operation of an operator control element associated with the second area prompts the second control signal to be triggered. Typically, one of the areas defined in this way may be located in the left-hand half and one may be located in the right-hand half of the display panel, as a result of which operation of the associated operator control element involves the rotation of the object about the vertical center axis conveying to the user the impression that he himself may be pushing the side of the object toward the rear. The delimited areas may also be located at other, potentially diametrically opposite, positions on the display panel, for example at the top and bottom or, in the case of a plurality of such areas, at the bottom left and right and the top left and right.

In particular, the display panel has a touch-sensitive surface, and a control signal may be triggered by the operation of buttons within the respective defined areas on the display panel. Alternatively, it may be also possible to use what are known as softkeys, so that operation can also be effected by means of mechanical operator control elements which may be assigned to an area on the display panel on a context-specific basis. By way of example, the driver and the front-seat passenger can perform operation by means of buttons on the display panel, while other vehicle occupants do this by means of a remote operator control unit having a touchpad or mechanical operator control elements in their range.

Within the context of disclosed embodiments, a button is understood to mean a control element on a graphical user interface. A button is distinguished from elements and panels for the pure display of information, what are known as display elements and display panels, in that they may be selectable. Selecting a button prompts execution of a function associated therewith. The function can result in alteration of the display of information. In addition, the buttons can be used to control devices in which the operator control may be supported by the information display. The buttons can therefore replace conventional mechanical switches. The buttons can be produced and displayed arbitrarily on a user-programmable display panel of a display. Furthermore, provision may be made for a button to be able to be marked. In this case, the associated function may be not yet performed. However, the marked button may be presented in a form highlighted in comparison with other buttons. The marking and/or selection of a button can be effected by means of cursor control or by virtue of direct operator control of a touch-sensitive surface on the display.

When a control signal is formed from a plurality of features, it is, thus, possible for the rotation of the object to simultaneously perform user recognition when a button or another operator control element may be operated. This enables some contents to be reserved for a particular circle of people or to be blocked for user groups. By way of example, contents could be enabled for a user in his role as a driver, and other contents could be enabled for him in his role as a vehicle keeper. It would also be possible to implement a child safety lock in this manner, for example when seat sensors or a camera system recognize(s) that there may be children in the rear seat of the vehicle.

The information presented on the graphical object may be associated with a user menu, with the first side being used to display basic functions and/or standard settings and a second side being used to display user-specific functions and/or detail settings. In particular, the user menu may be associated with a functional device in a vehicle. The information which may be displayed on the second side of the graphical object when the first control signal has been triggered may provide setting options for the driver of the vehicle, and the information which may be displayed on the second side of the graphical object when the second control signal has been triggered may provides setting options for the front-seat passenger of the vehicle.

In one implementation of the method according to disclosed embodiments, the functional device may be an air conditioning system for which a plurality of air conditioning situations have been defined, which have associated setting parameters for controlling individual air conditioning control units. The selection of a particular air conditioning situation may prompt the individual air conditioning control units to be controlled or regulated using the setting parameters, which may be associated with this air conditioning situation, wherein the first side of the presented two-dimensional object enables the air conditioning situations to be selected and the second side enables the setting parameters to be adjusted on a user-dependent basis. The display for the driver enables air conditioning settings to be made for the driver, and the display for the front-seat passenger enables air conditioning settings to be made for the front-seat passenger. Individual adjustment in the case air conditioning systems may be desirable particularly because firstly the individual perception of cold and heat may be very different and also sensitivity toward air flow varies greatly from person to person. Secondly, it may be necessary to customize the setting of the air conditioning system according to the time of day or season. In addition, the orientation of the vehicle to the sunlight and the vehicle geometry may require very different air conditioning for each seat position. Operator control of air conditioning, as may also be used for the method and takes account of setting parameters for individual air conditioning control units that are specific to defined air conditioning situations, is described in DE 10 2008 017 051 A1.

A method according to presently disclosed embodiments may also be advantageous for controlling other functional devices, for example for the audio driving of a stereo system or of a loudspeaker system.

The apparatus according to presently disclosed embodiments for operating a user interface may comprise a display panel for presenting a two-dimensional, graphical object and also means for producing at least a first and a second control signal. The apparatus furthermore may comprise a control device, which can be used to produce graphics data, which present at least one two-dimensional, graphical object, which can be presented on the display panel in a first presentation, which shows a first side of the object, and in a second presentation, which shows the second side of the object, wherein different sides of the object can be used to present different information, wherein the presentation of the graphical object can be altered such that the graphical object may be rotated from the first side to the second side in a perspective presentation on the display panel when a first or a second control signal has been triggered, wherein a rotation from the first side to the second side may be followed by different information being able to be presented on the second side on the basis of whether the first or the second control signal has been triggered. The apparatus may be particularly suitable for carrying out the presently disclosed method. It, therefore, has the same advantages as the presently disclosed method.

The means for producing control signals may be implemented in different ways. Control signals can be produced by means of manual operator control elements, such as keys, rotary press controllers or touch-sensitive panels, which are known as touchpads. These operator control elements may be also suitable for the operator control of softkeys. Advantageously, control signals may be produced by means of a display panel having a touch-sensitive surface, in which buttons, which may be triggered by touch or proximity sensing, may be displayed to a user. The means for producing control signals can be supported by various sensing means for user recognition, which may comprise sensor networks, radio identification systems or camera systems, in particular.

In accordance with disclosed embodiments, the apparatus for operating a user interface provides a user interface for an air conditioning system in a vehicle.

FIG. 1 schematically shows the design of a disclosed embodiment of the apparatus 10 for providing a user interface. The apparatus 10 may comprise a display panel 11, which can be used to display graphical objects 20. At the lower edge of the display panel 11, mechanical operator control elements 12 may be fitted. The display panel 11 may be equipped with a touch-sensitive surface, so that it may be possible to sense a touch by a user 30, for example with his fingertip, in a delimited area 24.

The display panel 11 and the operator control elements 12 may be connected to a control device 14, so that control signals triggered by means of the operator control elements 12 or the touch-sensitive surface can be transmitted to the control device 14 and the display contents on the display panel 11 can be controlled.

The control device 14 may be also connected by means of a data bus 15 in the vehicle to an air conditioning system 17 and another functional device 16, for example an infotainment device or a navigation system. The air conditioning system 17 comprises various air conditioning units 18, e.g. ventilation, cooling and heating elements, in the seat areas and rests and also integrated into the cockpit and the interior equipment of the vehicle. The individual air conditioning units 18 can be actuated separately by means of the control portion 17a of the air conditioning system 17. Furthermore, the control device 14 may be connected by means of the vehicle bus 15 to sensing means 19 for user recognition, which can be used to associate a user as a driver or front-seat passenger and/or perform vehicle occupant identification. The sensing means 19 for user recognition are known per se. In particular, they are in the form of a camera system or sensor arrangement in the seats of the vehicle.

The presentation of a two-dimensional, graphical object 20 according to a disclosed embodiment, when a first control signals has been triggered, is now be described with reference to FIGS. 2a-2d. The display panel 11 with the touch-sensitive surface may be used to present a graphical object 20, which can be altered by control signals triggered by a user 30. In this case, the display panel 11 may be integrated in the operator control console in the cockpit of the vehicle in the center between the driver and the front-seat passenger. The left-hand half of the display panel 11 may be therefore located particularly favorably for operator control by the driver, and the right-hand half can be operated with corresponding ease by the front-seat passenger.

Figure 2A:
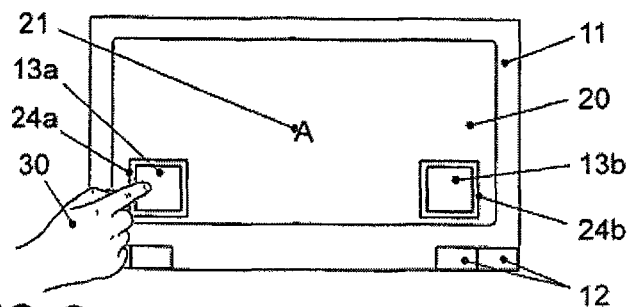
FIGS. 2a-2d show a presentation of a graphical object according to a disclosed embodiment of the method when a first control signal has been triggered.

FIG. 2a shows the two-dimensional object 20 from a first side 21, henceforth called the front (the two sides 22a, 22b shown later are accordingly called the backs). At the bottom left and right of the front 21 there may be respectively delimited areas 24a, 24b defined in, which a respective button 13a or 13b may be shown. The area 24a can be operated particularly comfortably from the driver's side, and the area 24b can be operated particularly comfortably from the front-seat passenger's side.

Figure 2B:
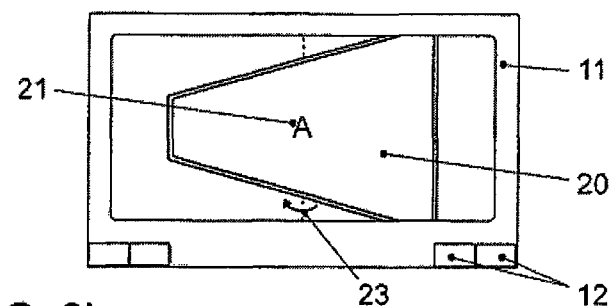
Figure 2C:
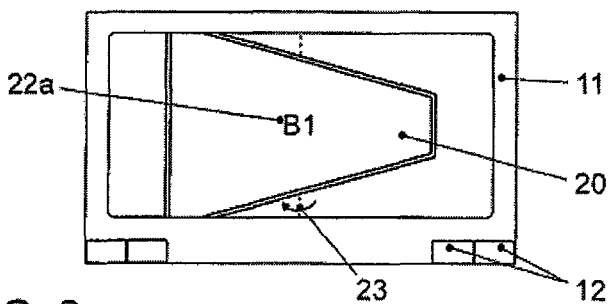
Figure 2D:
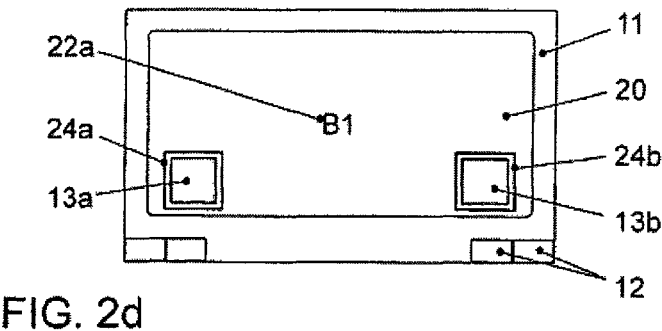

If the user 30, for example, the driver, uses an operating element, in this case his fingertip, to touch the button 13a in the area 24a, a first control signal may be produced, which may be associated with the driver of the vehicle. The presentation of the graphical object 20 may be then altered such that the graphical object 20 rotates in a perspective presentation on the display panel 11 from the front 21 to the back 22a about an axis of rotation 23, which may be formed by the vertical central axis. This rotation may be effected by virtue of the left-hand object half moving toward the rear in virtual terms, as shown in FIGS. 2b and 2c. For this control signal, the back 22a displays information (B1), which may be associated with the driver, who triggered the first control signal. When the rotation is complete, buttons 13a, 13b can be displayed in delimited areas 24 again as shown in FIG. 2d and could be used to trigger a fresh rotation on the front 21 (not shown), for example. In FIG. 2d, the display of a respective button 13a or 13b for the driver and front seat passenger has the advantage that both users can conveniently change back to the front. Alternatively, it may also be possible for there to be a limitation to a button for the respective current user.

FIGS. 3a-3d show the presentation of a graphical object according to a disclosed embodiment of a method shown in FIGS. 2a-2d in which, instead of the first control signal, a second control signal has been triggered.

Figure 3A:
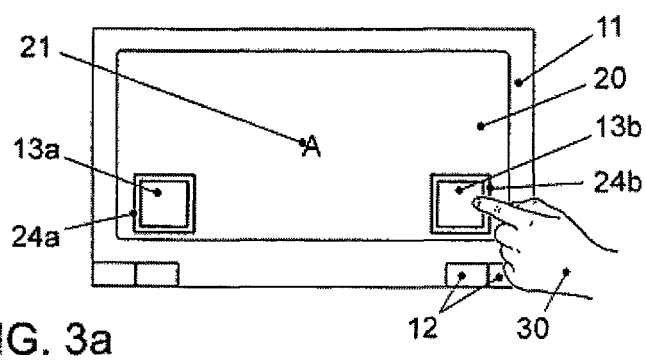
FIGS. 3a-3d shows the presentation of a graphical object according to the disclosed embodiment of the method shown in FIGS. 2a-2d in which, instead of the first control signal, a second control signal has been triggered.
Figure 3B:
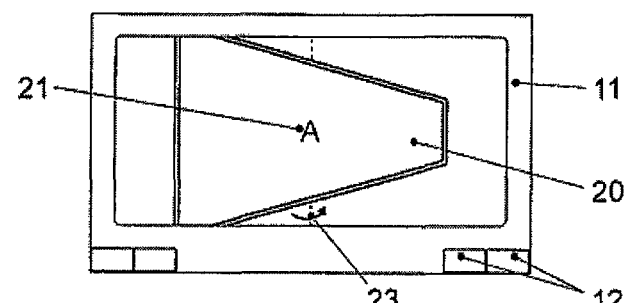
Figure 3C:
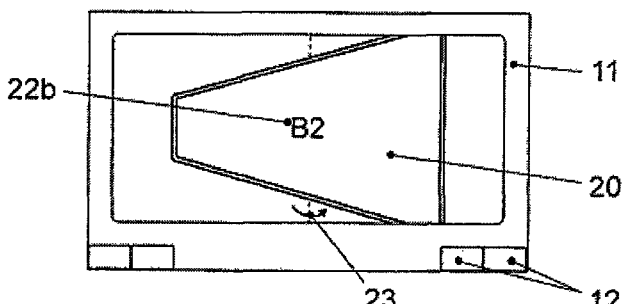
Figure 3D:
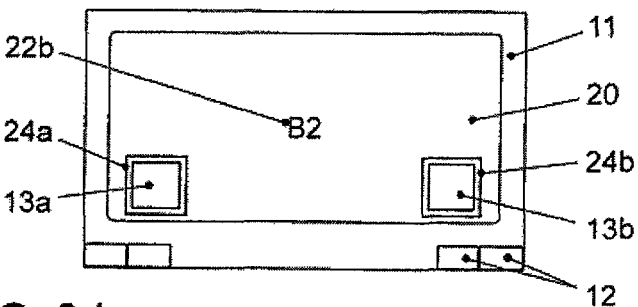

In this case, a user 30, that is to say the front seat passenger in this context, uses his fingertip to touch the button 13b in the area 24b. It may be the same user 30 or a different person. The crucial factor in this context may be the new role as a front seat passenger, which has been inferred from the operation of the button 13b in the area 24b. A second control signal may be produced, which is associated with the front seat passenger of the vehicle. This time, the presentation of the graphical object 20 may be altered such that the graphical object 20 rotates in a perspective presentation on the display panel 11 from the front 21 to the back 22b about the previously described axis of rotation 23, this time with the right-hand object half toward the rear, as shown in FIGS. 3b and 3c. For this control signal, the back 22b displays information (B2), which may be associated with the front seat passenger, who triggered the second control signal.

Alternatively, it would also be possible for control signals to be produced by virtue of the operation of an operator control element 12, with individual operator control elements 12 being able to be associated with individual users 30. In this case, the operator control elements 12 do not need to be fitted on the display panel 11, but rather may be mounted at any location in the vehicle (not shown), for example in the arm rests or in the rear of the backrests of the front seat, so that they can be used in vehicles with a plurality of rows of seats but only one display panel. In particular, four backs can be provided, the display of which may be achieved by a control signal from a respective seat position in the vehicle at the front right and left and at the rear right and left. The rotation from the front to the respective back could accordingly be effected from the center thereof via one of the corners at the top right and left and at the bottom right and left, about a horizontal and a vertical central axis in one and the other direction of rotation or about the two diagonals in one and the other direction of rotation.

Figure 4A:
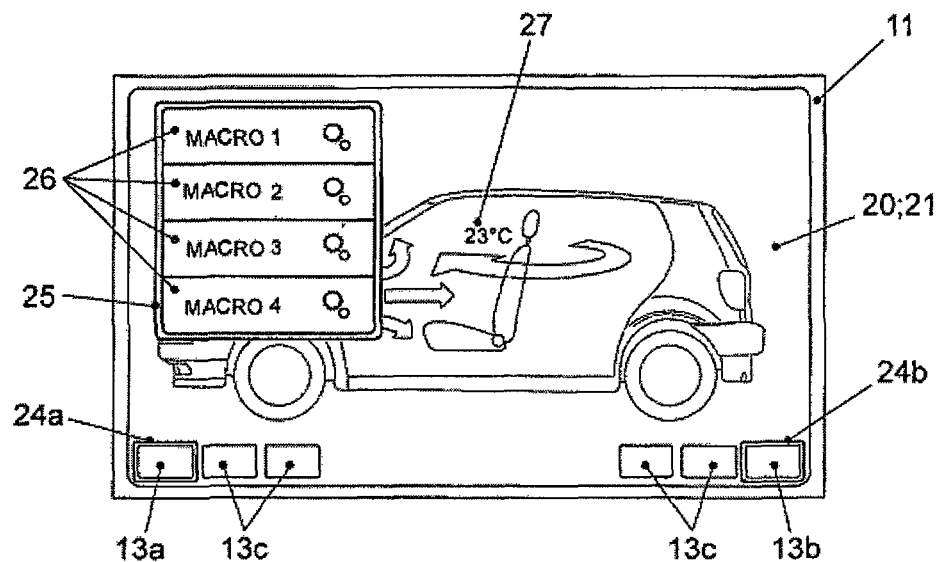
FIG. 4a shows the first side of a graphical object in the form of a user menu for an air conditioning system according to a disclosed embodiment of a method.
Figure 4B:
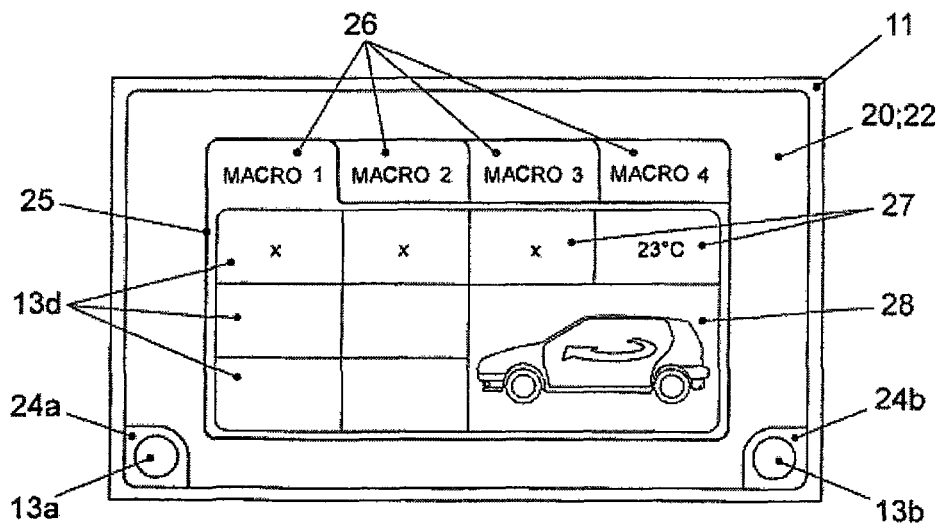
FIG. 4b shows a second side of the graphical object from FIG. 4a according to a disclosed embodiment of a method.

FIGS. 4a and 4b show a further disclosed embodiment for a method, in which graphical objects 20 may be used for the provision of a user menu 25, in this case for an air conditioning system 17 in a vehicle. In this case, provision may be made for the control of basic functions and standard settings on the front 21, while user-specific detail settings can be made on different backs 22. The presentation of the rotation and also the algorithm that the control signal can be taken as a basis for displaying different information on the back 22 can be effected in accordance with the description relating to FIGS. 2a-2d and 3a-3d.

For the user menu 25, a plurality of air conditioning situations 26 may be defined, which may be displayed on the front 21 of the user menu 25 according to FIG. 4a. By way of example, these air conditioning situations 26 may be stored in a memory in the control device 14 or in the air conditioning system 17. In the case of the disclosed embodiment described, the air conditioning situations 26 relate to the climatic circumstances at different times, for example on a winter's morning or at a summer's noon. The air conditioning situations 26 define typical use situations, as occur during the operation of the vehicle. The respective air conditioning situations 26 have associated setting parameters 27 for the control of the individual air conditioning control units 18. The setting parameters 27 and the association with the corresponding air conditioning situation 26 may be also stored in the memory in the control device 14 or the air conditioning system 17. An air conditioning situation 26 therefore has a plurality of associated setting parameters 27 for the individual air conditioning control units 18 of the air conditioning system 17 as a function macro. The selection of a particular air conditioning situation 26 therefore enables a multiplicity of setting parameters 27 for the air conditioning control units 18 to be adjusted simultaneously.

For the selection of the individual air conditioning situations 26, the display panel 11 may be used to present the front 21 of the graphical object 20, which is shown in FIG. 4a. The presentation shown comprises different buttons 13a, 13b and 13c, which can be operated by touching the display panel 11. The buttons 13a and 13b may be each in a delimited area 24a and 24b, which can be used, as already described, to produce a control signal for performing the object rotation. The buttons 13c have no relevance to the rotation and are hard or softkeys that are known per se. By way of example, they can be used for setting a temperature preselection for the driver and front seat passenger, or else may be associated with the air conditioning situations 26. Alternatively, the air conditioning situations 26 displayed may themselves be in the form of buttons, and an appropriate air conditioning situation 26 can be selected by simply touching the relevant location on the display panel 11. Furthermore, appropriate basic information, for example setting parameters 27 such as setpoint temperature control, can be displayed. This reduces operator control of the air conditioning system 17 to the essential and enables very clear ease of use for standard situations.

If a user now triggers a control signal in accordance with the method described previously, for example by touching one of the buttons 13a or 13b, then the front 21 of the user menu 25 rotates on the basis of the control signal to a back 22, the content of which may be dependent on the control signal. In particular, the back 22 provides detail settings, which a user can use to control only those air conditioning settings which relate to him, for example only for his seat or only for an area formed around his seat position.

FIG. 4b shows the back 22 of the graphical object 20 for the provision of a user menu 25, which may be displayed following operation of the button 13a or 13b. In this disclosed embodiment, the different backs 22 differ not in terms of their structure but rather only in terms of the setting parameters 27, for which reason a presentation of alternative backs 22 may be dispensed with. The air conditioning situations 26 already presented on the front 21 may be presented in the form of a tab menu with the associated setting parameters 27, which the relevant user can use to manually alter the setting parameters 27, which relate to him and which may be associated with the air conditioning situations 26. In this case, the setting parameters 27 can be selected in the form of buttons 13d on the tab menu. In particular, the user can individually adjust the setpoint temperature control and the supply of air for the area of his seat, with a supplementary window 28 being able to be used to visually display relevant setting parameters 27 and air conditioning units 18. A button 13a or 13b may be used to take the user back to the front 21.

The method described enables fine tuning of individual setting parameters 27 in the air conditioning system 17, in particular. In this case, not only is it possible to implement the customization to a fixed air conditioning situation 26, it may be therefore also possible to perform a customization by means of macro settings in order to take account of customer requirements based on country-specific or climate-specific customizations or equipment variants without unnecessarily complicating the number of operator control elements or the operator control concept in the process. This increases customer acceptance and operator control convenience and hence contributes to road safety.

In a similar manner to the user menu 25 shown in FIGS. 4a and 4b, the method and the apparatus according to disclosed embodiments can be used to control a wide variety of functional devices 16, particularly in a vehicle.

LIST OF REFERENCE SYMBOLS

10 Apparatus for operating a user interface
11 Display panel
12 Operator control element
13a, b Buttons
13c, d Further buttons
14 Control device
15 Data bus
16 Functional device
17 Air conditioning system
17a Control portion of the air conditioning system
18 Air conditioning device
19 Sensing means for user recognition
20 Graphical object
21 First side
22a, b Second side
23 Axis of rotation
24a, b Delimited area
25 User menu
26 Air conditioning situation
27 Setting parameter
28 Supplementary window
30 User

The invention claimed is:

1. A method for operating a user interface, the method comprising:
    presenting at least one two-dimensional, graphical object on a display panel in a first presentation, which shows a first side of the object, and in a second presentation, which shows a second side of the object, wherein different sides of the object are used to present different information;
    altering the presentation of the graphical object such that the graphical object is rotated from the first side to the second side in a perspective presentation on the display panel when a first or a second control signal has been triggered;
    wherein a direction of rotation of the graphical object about a center of rotation associated with the rotation is dependent on the control signal that has been triggered, and
    presenting different information on the second side based on whether the first or second control signal has been triggered and a corresponding direction of rotation has occurred from the first side;
    associating the information presented on the graphical object with a user menu,
    wherein the first side is used to display basic functions and/or standard settings and the second side is used to display user-specific functions and/or user-specific detail settings;
    wherein first functions and/or first detail settings specific to a first user are displayed, and functions and/or detail settings specific to a second user are not displayed, on the second side in response to triggering the first control signal; and
    wherein second functions and/or second detail settings specific to the second user are displayed, and functions and/or detail settings specific to the first user are not displayed, on the second side in response to triggering the second control signal.

2. The method of claim 1, further comprising:
    sensing a user who has triggered the control signal using an operating event; and
    associating the control signal with the first or the second control signal based on the sensed user.

3. The method of claim 1, further comprising:
    defining at least two delimited areas on the display panel;
    prompting, by operation of an operator control element associated with the first area, the first control signal to be triggered; and
    prompting, by operation of an operator control element associated with the second area, the second control signal to be triggered.

4. The method of claim 3, wherein the display panel has a touch-sensitive surface, and wherein the control signal is triggered by operation of buttons within the at least two delimited areas on the display panel.

5. The method of claim 1, further comprising associating the user menu with a functional device in a vehicle, wherein the information which is displayed on the second side of the graphical object when the first control signal has been triggered provides setting options for a driver of the vehicle, and the information which is displayed on the second side of the graphical object when the second control signal has been triggered provides setting options for a front-seat passenger of the vehicle.

6. The method of claim 5, wherein the functional device is an air conditioning system for which a plurality of air conditioning situations have been defined, which each have associated setting parameters for controlling individual air conditioning control units, wherein selection of a particular air conditioning situation prompts the individual air conditioning control units to be controlled or regulated using the setting parameters that are associated with this air conditioning situation, and wherein the first side of the presented two-dimensional object enables the air conditioning situations to be selected and the second side enables the setting parameters to be adjusted on a user-dependent basis.

7. An apparatus for operating a user interface, comprising:
a display panel for presenting a two-dimensional, graphical object;
means for producing at least a first and a second control signal;
a control device that produces graphics data which present at least one two-dimensional, graphical object for presentation on the display panel in a first presentation that shows a first side of the object, and in a second presentation that shows a second side of the object, wherein the different sides of the object present different information, wherein the presentation of the graphical object can be altered such that the graphical object is rotated from the first side to the second side in a perspective presentation on the display panel when a first or a second control signal has been triggered, and wherein a direction of rotation about a center of rotation of the graphical object from the first side to the second side is followed by different information being presented on the second side based on whether the first or the second control signal has been triggered and a corresponding direction of rotation dependent on the first or second control signal being triggered;
wherein the information presented on the graphical object is a user menu,
wherein the first side is used to display basic functions and/or standard settings and the second side is used to display user-specific functions and/or user-specific detail settings;
wherein first functions and/or first detail settings specific to a first user are displayed, and functions and/or detail settings specific to a second user are not displayed, on the second side in response to triggering the first control signal; and
wherein second functions and/or second detail settings specific to the second user are displayed, and functions and/or detail settings specific to the first user are not displayed, on the second side in response to triggering the second control signal.

8. The apparatus of claim 7, wherein the apparatus provides a user interface for an air conditioning system in a vehicle.

9. The apparatus of claim 7, wherein a user who has triggered the control signal using an operating event is sensed and the control signal is associated with the first or the second control signal based on the sensed user.

10. The apparatus of claim 7, further comprising a camera system or sensor arrangement in seats of a vehicle for sensing a user who has triggered the control signal.

11. The apparatus of claim 7, wherein at least two delimited areas are defined on the display panel, wherein operation of an operator control element associated with the first area prompts the first control signal to be triggered, and wherein operation of an operator control element associated with the second area prompts the second control signal to be triggered.

12. The apparatus of claim 11, wherein the display panel has a touch-sensitive surface, and wherein the control signal is triggered by operation of buttons within the at least two delimited areas on the display panel.

13. The apparatus of claim 7, wherein the user menu is associated with a functional device in a vehicle, and wherein the information which is displayed on the second side of the graphical object when the first control signal has been triggered provides setting options for a driver of the vehicle, and the information which is displayed on the second side of the graphical object when the second control signal has been triggered provides setting options for a front-seat passenger of the vehicle.

14. The apparatus of claim 13, wherein the functional device is an air conditioning system for which a plurality of air conditioning situations have been defined, which each have associated setting parameters for controlling individual air conditioning control units, wherein selection of a particular air conditioning situation prompts the individual air conditioning control units to be controlled or regulated using the setting parameters that are associated with this air conditioning situation, and wherein the first side of the presented two-dimensional object enables the air conditioning situations to be selected and the second side enables the setting parameters to be adjusted on a user-dependent basis.

15. The apparatus of claim 7, wherein the control device comprises a memory for storing setting parameters.

16. The apparatus of claim 7, wherein the means for producing at least a first and a second control signal comprises buttons within at least two delimited areas of the display panel.

* * * * *